United States Patent
Park et al.

(10) Patent No.: US 12,103,584 B2
(45) Date of Patent: Oct. 1, 2024

(54) STEERING CONTROL APPARATUS AND METHOD

(71) Applicant: HL MANDO CORPORATION, Pyeongtaek-si (KR)

(72) Inventors: Ji Hoon Park, Seongnam-si (KR); Sun Hong Park, Yongin-si (KR); Hyun Chul Tae, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 218 days.

(21) Appl. No.: 17/790,074

(22) PCT Filed: Dec. 24, 2020

(86) PCT No.: PCT/KR2020/019081
§ 371 (c)(1),
(2) Date: Jun. 29, 2022

(87) PCT Pub. No.: WO2021/137528
PCT Pub. Date: Jul. 8, 2021

(65) Prior Publication Data
US 2023/0058697 A1    Feb. 23, 2023

(30) Foreign Application Priority Data

Dec. 31, 2019 (KR) .......................... 10-2019-0179321

(51) Int. Cl.
*B62D 15/02* (2006.01)
(52) U.S. Cl.
CPC ...... *B62D 15/0245* (2013.01); *B60Y 2300/02* (2013.01)
(58) Field of Classification Search
CPC .. B62D 15/0245; B62D 15/021; B62D 6/002; B60Y 2300/02
See application file for complete search history.

(56) References Cited

U.S. PATENT DOCUMENTS

| | | | |
|---|---|---|---|
| 11,919,581 B2* | 3/2024 | Yamaguchi | B62D 5/0481 |
| 2003/0127273 A1* | 7/2003 | Fukumoto | B62D 6/10 |
| | | | 180/400 |

(Continued)

FOREIGN PATENT DOCUMENTS

| CN | 104880146 A | 9/2015 |
|---|---|---|
| CN | 107757708 A | 3/2018 |

(Continued)

OTHER PUBLICATIONS

Office Action issued on Dec. 12, 2023 for corresponding Chinese Patent Application No. 202080090839.2, along with partial English translation (19 pages).

(Continued)

*Primary Examiner* — George C Jin
(74) *Attorney, Agent, or Firm* — Hauptman Ham, LLP

(57) ABSTRACT

The present disclosure relates to a steering control apparatus and method, the apparatus comprising: a reception unit which receives an ignition-off signal and an ignition-on signal, and which receives relative steering angle information received from a relative steering angle sensor for measuring only the relative angle of a steering wheel; a calculation unit which calculates section information by using the relative steering angle information, and which calculates absolute steering angle information on the basis of the relative steering angle information and the section information; and a control unit which determines, when the ignition-off signal is received, whether absolute steering angle calculation conditions enabling calculation of the absolute steering angle information are satisfied even after the ignition is off, and which generates an ignition-off control signal according to the determination result.

16 Claims, 10 Drawing Sheets

(56) References Cited

U.S. PATENT DOCUMENTS

| | | | |
|---|---|---|---|
| 2008/0119986 A1* | 5/2008 | Wei | B62D 15/0245 |
| | | | 701/41 |
| 2013/0151080 A1* | 6/2013 | Lavoie | B62D 5/0481 |
| | | | 701/42 |
| 2013/0205917 A1 | 8/2013 | Becker et al. | |
| 2015/0051794 A1 | 2/2015 | Wei | |
| 2015/0367887 A1* | 12/2015 | Fujita | B62D 5/049 |
| | | | 701/41 |
| 2016/0339958 A1* | 11/2016 | Fujita | B62D 15/021 |
| 2017/0101126 A1* | 4/2017 | Kim | B62D 15/0245 |

FOREIGN PATENT DOCUMENTS

| | | |
|---|---|---|
| CN | 109501859 A | 3/2019 |
| DE | 198 16 928 A1 | 10/1998 |
| DE | 601 03 232 T2 | 5/2005 |
| JP | H02-299976 A | 12/1990 |
| JP | H06-99833 A | 4/1994 |
| JP | 2008-151762 A | 7/2008 |
| KR | 10-0872638 B1 | 12/2008 |
| KR | 10-2009-0110168 A | 10/2009 |
| KR | 10-2017-0071312 A | 6/2017 |

OTHER PUBLICATIONS

International Search Report issued on Mar. 31, 2021, in connection with International Patent Application No. PCT/KR2020/019081, along with an English translation.
Written Opinion issued on Mar. 31, 2021, in connection with International Patent Application No. PCT/KR2020/019081.
Office Action issued on Mar. 18, 2024 for corresponding Germany Patent Application No. 11 2020 006 417.4 (7 pages).

* cited by examiner

STEERING CONTROL APPARATUS AND METHOD

CROSS-REFERENCE TO RELATED APPLICATIONS

The present application is a national stage filing under 35 U.S.C § 371 of PCT application number PCT/KR2020/019081 filed on Dec. 24, 2020, which is based on and claims priority to Korean Patent Application No. 10-2019-0179321 filed on Dec. 31, 2019, in the Korean Intellectual Property Office, which are incorporated herein by reference in their entireties.

TECHNICAL FIELD

The disclosure relates to a steering control device and method and, more specifically, to a technique for calculating an absolute steering angle using one relative steering angle sensor of a steering wheel.

BACKGROUND ART

In a steering system of a vehicle, an absolute steering angle of a steering wheel may be measured using a difference between steering angles measured from two relative steering angle sensors.

However, the steering angle sensor is expensive and takes up a substantial part of the cost of the steering device.

Therefore, a need exists for developing a technique capable of measuring the absolute steering angle of the steering wheel even with a single relative steering angle sensor.

DETAILED DESCRIPTION OF THE INVENTION

Technical Problem

The disclosure proposes a steering control device and method capable of measuring the absolute steering angle using one relative steering angle sensor.

The disclosure also proposes a steering control device and method capable of verifying and correcting the accuracy of the absolute steering angle measurement using other sensor information and collision detection information.

Technical Solution

In an aspect, the present embodiments may provide a steering control device comprising a receiver receiving an ignition-off signal and an ignition-on signal and receiving relative steering angle information received from a relative steering angle sensor measuring only a relative angle of a steering wheel, a calculator calculating range information using the relative steering angle information and calculating absolute steering angle information based on the relative steering angle information and the range information, and a controller determining whether an absolute steering angle calculation condition for calculating the absolute steering angle information even after ignition-off is met when the ignition-off signal is received and generating an ignition-off control signal according to a result of the determination.

In another aspect, the present embodiments may provide a steering control method comprising an ignition signal reception step receiving an ignition-off signal and an ignition-on signal, an information reception step receiving relative steering angle information received from a relative steering angle sensor measuring only a relative angle of a steering wheel, an information calculation step calculating range information using the relative steering angle information and calculating absolute steering angle information based on the relative steering angle information and the range information, and a control signal generation step determining whether an absolute steering angle calculation condition for calculating the absolute steering angle information even after ignition-off is met when the ignition-off signal is received and generating an ignition-off control signal according to a result of the determination.

Advantageous Effects

As described above, the disclosure may provide a steering control device and method capable of measuring the absolute steering angle using one relative steering angle sensor.

The disclosure may also provide a steering control device and method capable of verifying and correcting the accuracy of the absolute steering angle measurement using other sensor information and collision detection information.

MODE FOR CARRYING OUT THE INVENTION

Figure 1:
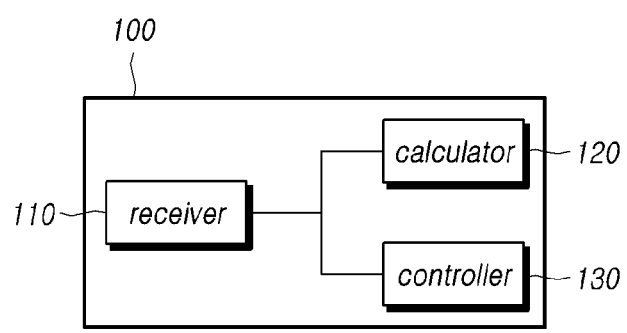
FIG. 1 is a block diagram illustrating a steering control device according to the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the disclosure, the absolute steering angle being 0 degrees is defined as steering wheel neutral, a left rotational angle as a negative number, and a right rotational angle as a positive number. The relative steering angle has a value ranging from 0 degrees to 360 degrees and, when the steering wheel is positioned neutral, the relative steering angle is defined as 180 degrees.

FIG. 1 is a block diagram illustrating a steering control device 100 according to the disclosure.

Referring to FIG. 1, a steering control device 100 comprises a receiver 110 receiving an ignition-off signal and an ignition-on signal and receiving relative steering angle information received from a relative steering angle sensor measuring only a relative angle of a steering wheel, a calculator 120 calculating range information using the relative steering angle information and calculating absolute steering angle information based on the relative steering angle information and the range information, and a controller 130 determining whether an absolute steering angle calculation condition for calculating the absolute steering angle information even after ignition-off is met when the ignition-off signal is received and generating an ignition-off control signal according to a result of the determination.

The receiver 110 may receive an ignition-off signal and an ignition-on signal, and may receive relative steering angle information. Further, the receiver 110 may receive other sensor information and collision detection information.

The ignition-off signal and ignition-on signal refer to signals generated from an ignition switch for igniting the engine of the vehicle. If the ignition switch is turned off (OFF), an ignition-off signal is generated, and if the ignition switch is on (ON), an ignition-on signal is generated. However, the disclosure includes a configuration of performing ignition-off when an absolute steering angle calculation condition is met rather than performing ignition-off immediately only with generation of an ignition-off signal. The absolute steering angle calculation condition is described below in detail in connection with the embodiment of the controller 130.

The relative steering angle information is information about the relative steering angle of the steering wheel, measured using a relative steering angle sensor. The relative steering angle sensor may detect only the angle at which the steering wheel is rotated between 0 degrees and 360 degrees which is within a one-rotation range even when the steering wheel is positioned in a range exceeding one rotation. The relative steering angle information about the steering wheel may include a measurement value regarding the rotational angle of the steering wheel in a range from 0 degrees to 360 degrees which are angles corresponding to one rotation.

For example, if the absolute steering angle is +390 degrees, the steering wheel has been rotated 30 degrees further from the state of having made one right rotation from neutral (+360 degrees). Thus, the relative steering angle is 210 degrees which are 30 degrees to the right further than 180 degrees which is neutral. Resultantly, only the information indicating that the relative steering angle is 210 degrees may be known from the relative steering angle sensor and, without information regarding the rotation range of the steering wheel, the absolute steering angle may not be known.

Other sensor information refers to information detected by a sensor other than the relative steering angle sensor. The other sensor may include any sensor capable of calculating the range information or absolute steering angle information about the steering wheel based on information detected from the sensor, and any information detected by the sensor may be included in the other sensor information.

For example, since the rotational angle of the steering motor and the rotational angle of the steering wheel may have a certain correlation, information regarding the steering angle may be calculated using rotational angle sensing information received from the motor sensor. Further, since the steering torque and the rotation angle of the steering wheel may have a certain correlation, information regarding the steering angle may be calculated based on the torque sensing information received from the torque sensor.

Calculating information regarding the steering angle using the other sensor information is described below in detail in connection with an embodiment for the calculator 120.

The collision detection information refers to information detected by a collision detection sensor that detects a collision of a vehicle. The collision detection sensor may operate even after ignition is off. Accordingly, when the ignition is turned on, the receiver 110 may receive collision detection information regarding whether a collision is detected after the last ignition-off.

The controller 130 may generate a steering wheel align control signal based on the other sensor information and collision detection information, and this is described below in greater detail in connection with an embodiment for the controller 130 and an embodiment in connection with FIG. 6.

The calculator 120 may calculate range information using the relative steering angle information and calculate absolute steering angle information based on the relative steering angle information and the range information. Further, the calculator 120 may calculate target steering angle information to move the steering wheel to a predetermined specific range when the range information does not correspond to the specific range. If the other sensor information is received by the receiver 110, the calculator 120 may calculate the range sensing information based on the other sensor information.

The range information refers to information regarding the rotation range of the steering wheel. The rotation range of the steering wheel refers to a predetermined range divided from the whole angular range in which the steering wheel is rotatable, with respect to the absolute steering angle. The range in which the steering wheel is currently positioned may be known by measuring the relative steering angle if the range in which the steering wheel is initially positioned is known. In other words, since whether the steering wheel moves between ranges may be known through a variation in the measurement value of the relative steering angle, the range information may be calculated even with relative steering angle information alone.

For example, if the steering wheel is able to make three rotations in total, and is rotatable within a range of 1080 degrees, it is assumed that the rotation range is defined as a first range in which the absolute steering angle is −540 degrees to −180 degrees, a second range in which the absolute steering angle is −180 degrees to +180 degrees, and a third range in which the absolute steering angle is +180 degrees to +540 degrees. In this case, in a case where the initial position of the steering wheel is in the second range, and the neutral of the relative steering angle is 180 degrees, if the relative steering angle increases to 360 degrees and then varies by 30 degrees, this is the case where the steering wheel rotates to the right in the second range in which the initial position is and goes beyond the second range. Thus, the calculator 120 may calculate the current range information about the steering wheel as the third range.

The absolute steering angle information refers to information regarding the absolute steering angle of the steering wheel and is a value continuously measured within the whole angular range in which the steering wheel is rotatable. Thus, the absolute position of the steering wheel may be known even with the absolute steering angle information alone.

Such absolute steering angle information may be calculated by calculating the difference between the signals received by two relative steering angle sensors using a vernier algorithm or may also be calculated based on the range information about the steering wheel and the relative steering angle information. In other words, even when there is only one relative steering angle sensor, the absolute steering angle information may be calculated if the range information about the steering wheel may be known.

For example, in a case where the steering wheel is a product the absolute steering angle of which is defined as a first range from −540 degrees to −180 degrees, a second range from −180 degrees to +180 degrees, and a third range from +180 degrees to +540 degrees, and the range information about the steering wheel has three ranges, and the relative steering angle information is 210 degrees, +390 degrees which is +180 degrees, which is the rightmost end of the second range, plus 210 degrees, which is the relative steering angle, may be calculated as the absolute steering angle information.

The target steering angle information refers to information for moving the steering wheel to a specific point in a specific range. The specific point in the target steering angle information may be any point which is included in the specific range. For example, the specific point may be set as the neutral point where the absolute steering angle is always 0 degrees or may be set as +180 degrees if the absolute steering angle is +180 degrees or more or as −180 degrees if the absolute steering angle is −180 degrees or less. As such, the specific point may be set in various manners.

Unlike this, the target steering angle information may be calculated as a remainder, except for a quotient, when dividing an absolute steering angle based on the absolute steering angle information by a preset target steering angle reference value.

For example, in a case where the absolute steering angle information is +210 degrees, the specific range is the second range in which the absolute steering angle ranges from −180 degrees to +180 degrees, and the target steering angle reference value is set as 180 degrees, the target steering angle information may be calculated as +30 degrees which is the remainder after +210 is divided by 180, except for 1 which is the quotient. In such a case, since it may be known that the target steering angle information is calculated always within the second range from −180 degrees to +180 degrees and thus corresponds to the second range, the absolute steering angle calculation condition may be met even after ignition-off.

The range sensing information refers to information regarding the rotation range in which the steering wheel is positioned and may be calculated based on the other sensor information.

For example, if the other sensor information includes rotational angle sensing information about the steering motor, received from the motor sensor, the absolute steering angle may be calculated using the correlation between the rotational angle of the steering motor and the rotational angle of the steering wheel. Or, if the other sensor information includes steering torque sensing information received from the torque sensor, the absolute steering angle may be calculated using the correlation between the steering torque and the rotational angle of the steering wheel. Alternatively, any other known sensors than the motor sensor and the torque sensor may be used which are able to calculate the absolute steering angle based on the sensing information.

As such, if the absolute steering angle is calculated using the other sensor information, range sensing information regarding the rotation range of the steering wheel may be calculated using the calculated absolute steering angle.

Thus, the calculator 120 may calculate the absolute steering angle regarding the absolute position of the steering wheel based on the other sensor information and calculate the range sensing information about the steering wheel based on the calculated absolute steering angle. However, without limited thereto, the calculator 120 may calculate the range sensing information about the steering wheel from the other sensor information immediately without calculating the absolute steering angle.

The controller 130 may determine whether an absolute steering angle calculation condition for calculating the absolute steering angle information even after ignition-off is met when the ignition-off signal is received and generate an ignition-off control signal according to a result of the determination.

Further, when an ignition-off signal is received, the controller 130 may determine whether the range information corresponds to a preset specific range and, if not corresponding to the specific range, generate a steering wheel correction control signal for moving the steering wheel to the specific range and, if steering wheel correction is performed according to the steering wheel correction control signal, generate an ignition-off control signal to perform ignition-off.

If steering wheel correction is performed according to the steering wheel correction control signal, the controller 130 may generate a steering wheel lock control signal for preventing the steering wheel from moving before the ignition-off control signal is generated. Further, if an ignition-on signal is received after ignition-off, the controller 130 may generate a steering wheel unlock control signal for unlocking the steering wheel.

If the receiver 110 receives other sensor information or collision detection information and receives an ignition-on signal, the controller 130 may determine whether it is needed to align the steering wheel based on the received information and generate a steering wheel align control signal for aligning the steering wheel to the neutral state according to a result of the determination.

The absolute steering angle calculation condition refers to a condition regarding whether it is possible to calculate the absolute steering angle information based on the relative steering angle information even after ignition-off. The absolute steering angle may be calculated using, e.g., a vernier algorithm if there are two or more relative steering angle sensors. However, if there is only one relative steering angle sensor, range information regarding the rotation range of the steering wheel should be known to be able to calculate the absolute steering angle information. In other words, if there is only one relative steering angle sensor, the absolute steering angle calculation condition may be set as a condition under which range information about the steering wheel may be known even after ignition-off.

To figure out the range information, a separate storage signal may be generated, and range information before ignition-off may be stored to be used when ignition is turned on, or correction may be performed so that the steering wheel is positioned in a preset specific range before ignition-off and, when ignition is turned on, the initial position of the steering wheel is present within the specific range. In this regard, the configuration of generating the separate storage signal and storing the range information is described below in detail in connection with FIG. 4, and the configuration of correcting to allow the steering wheel to be positioned in the specific range is described below in detail in connection with FIG. 5.

The ignition-off control signal refers to a control signal that allows ignition-off to be actually performed when the receiver 110 receives an ignition-off signal.

If ignition-off is performed without meeting the absolute steering angle calculation condition, the range information about the steering wheel may not be known when ignition is turned on later and, if range information is not known, it is impossible to calculate the absolute steering angle information only with the relative steering angle information.

Accordingly, the controller 130 may generate an ignition-off control signal to prevent ignition from being turned off when the absolute steering angle calculation condition is not met and to allow ignition to be turned off when the absolute steering angle calculation condition is met.

The steering wheel lock control signal refers to a control signal to prevent movement of the steering wheel, and the steering wheel unlock control signal refers to a control signal to unlock the steering wheel to enable movement of the steering wheel.

Even when the absolute steering angle calculation condition is met before ignition-off, if the movement of the steering wheel is enabled after ignition-off, the rotation range of the steering wheel is changed so that the range information may be varied. Thus, it is required to prevent movement of the steering wheel after ignition-off so as to maintain the meeting of the absolute steering angle calculation condition until ignition is turned on.

Accordingly, although the ignition-off signal is received, and the absolute steering angle calculation condition is met, the controller 130 may generate a steering wheel lock control signal to prevent movement of the steering wheel and then generate an ignition-off control signal, rather than immediately generating an ignition-off control signal.

Further, when an ignition-on signal is received, the controller 130 needs to unlock the locked steering wheel before the last ignition-off to enable movement of the steering wheel so as to perform the steering of the vehicle and may thus allow a steering wheel unlock control signal to be generated.

The steering wheel correction control signal refers to a control signal for moving the steering wheel to a preset specific range when the range information does not correspond to the specific range.

If there is only one relative steering angle sensor, the absolute steering angle calculation condition may be set as whether the range information may be known even after ignition-off. If ignition-off is performed in a state in which the steering wheel is always in the specific range, the steering wheel is in the specific range even when ignition is turned on so that range information may be known. Thus, the absolute steering angle calculation condition may be met.

Therefore, when the ignition-off signal is received, the controller 130 may determine whether the range information corresponds to the specific range and, if not corresponding to the specific range, generate a steering wheel correction control signal for moving the steering wheel to the specific range. Any known technique related to the movement control of the steering wheel may be applicable to the control for moving the steering wheel to the specific range.

Further, since correction of the steering wheel is possible at any point included in the specific range, it is possible to generate a steering wheel correction control signal based on the target steering angle information calculated by the calculator 120.

Additionally, when the steering wheel correction control signal is generated, the controller 130 may immediately control to move the steering wheel to the specific range, and the controller 130 may transmit a steering wheel align notification message to the user to guide the user to move the steering wheel to the specific range. Or, the controller 130 may transmit a steering wheel align notification message to the user and, if the steering wheel is not moved to the specific range within a certain preset time, perform control to move the steering wheel to the specific range.

In sum, after the steering wheel is allowed to be positioned in the specific range according to the steering wheel correction control signal, and the steering wheel is prevented from moving according to the steering wheel lock control signal, if ignition-off is performed according to the ignition-off control signal, it is possible to know the range information as the steering wheel is positioned in the specific range even when ignition is turned on. Accordingly, it is possible to calculate the absolute steering angle information based on the relative steering angle information sensed by one relative steering angle sensor and the range information known after ignition is turned on.

The steering wheel align control signal refers to a control signal to match the actual position of the steering wheel to the position of the steering wheel determined based on the range information and the relative steering angle information if the range sensing information calculated by the calculator 120 and the range information differ as a result of comparison when ignition is turned on or if a collision is detected after the last ignition-off based on the collision detection information received by the receiver 110.

Even when the absolute steering angle calculation condition is met before ignition-off so that absolute steering angle information may be calculated even with only one relative steering angle sensor after ignition is turned on, such an error as an inconsistency between the actual position of the steering wheel and the position of the steering wheel determined based on the relative steering angle and the range information may occur.

For example, as wrong range information may be calculated or the neutral of the steering wheel may be displaced due to, e.g., an error or malfunction of the relative steering angle sensor before ignition-off, an error may occur. Further, as the vehicle collides after ignition-off, the range information may be varied or the steering wheel may be moved, causing an error.

When such an error occurs, the steering wheel needs to be realigned to precisely calculate the absolute steering angle and the range information after ignition is turned on.

Accordingly, an ignition-on signal is received, and the controller 130 compares range sensing information calculated based on the other sensor information with the range information and, if a result of the comparison reveals that the two pieces of information indicate different ranges, the controller may determine that an error occurred and generate a steering wheel align control signal for realigning the steering wheel. Unlike this, the controller 130 may compare the absolute steering angle range information calculated based on the other sensor information with the absolute steering angle information calculated based on the relative steering angle information and, if the difference between the two values is a preset reference value or more, determine that an error occurs and generate a steering wheel align control signal.

Further, if an ignition-on signal is received, and a collision after the last ignition-off is detected based on the collision detection information received from the collision detection sensor, the controller 130 may determine that an error occurs between the position of the steering wheel determined based on the range information and relative steering angle and the actual position of the steering wheel and generate a steering wheel align control signal to realign the steering wheel.

To align the steering wheel, any known technique for matching the actual position of the steering wheel with the measurement value, as well as techniques for aligning the steering wheel to the neutral state may be used.

Additionally, if the range information and the absolute steering angle information calculated based on the relative steering angle information and range sensing information and the absolute steering angle calculated based on the other sensor information are compared, and it is determined that an error occurs between the absolute steering angle information and the range information, the steering wheel may be allowed to be moved and aligned as described above, or the stored values for the range information and the absolute steering angle information stored in the storage device may be modified into the absolute steering angle and the range sensing information value calculated based on the other sensor information.

Figure 2:
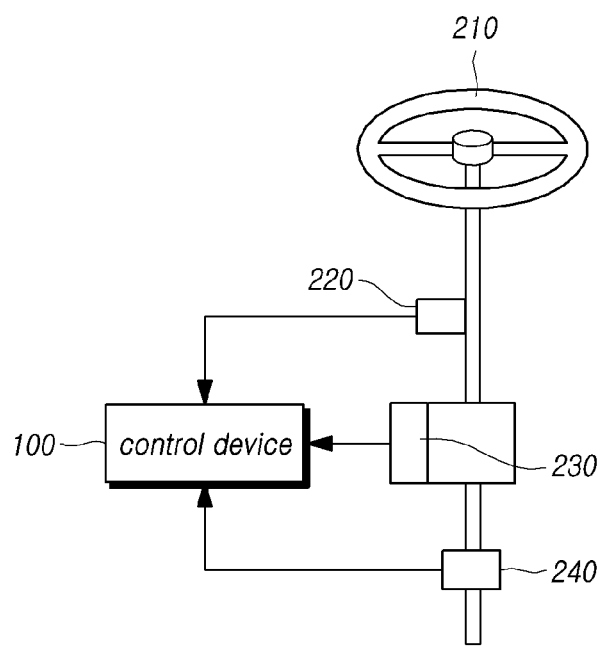
FIG. 2 is a view illustrating an example of a configuration a steering device including a steering control device according to an embodiment.

FIG. 2 is a view illustrating an example of a configuration a steering device including a steering control device according to an embodiment.

Referring to FIG. 2, a steering device may include a steering control device 100, a steering wheel 210, a relative steering angle sensor 220, a motor sensor 230, and a torque sensor 240.

When an ignition-off signal is received, the steering control device 100 may generate an ignition-off control signal for performing ignition-off if the absolute steering angle calculation condition is met and, if the absolute steering angle calculation condition is not met, generate a steering wheel correction control signal and control to move the steering wheel 210 to the specific range and then generate an ignition-off control signal for performing ignition-off.

As described above, if ignition-off is performed in a state in which the absolute steering angle calculation condition is met, range information regarding the rotation range in which the steering wheel 210 is positioned when ignition is turned on later may be known, so that it is possible to calculate the absolute steering angle information based on the known range information and relative steering angle information even when there is only one relative steering angle sensor 220.

The steering control device 100 may calculate the absolute steering angle using other sensor information received from another sensor including the motor sensor 230 and the torque sensor 240 and calculate the range sensing information based on the calculated absolute steering angle. Then, if the ranges indicated by the range sensing information and the range information compared with each other differ from each other or if the difference between the calculated absolute steering angle and the absolute steering angle information compared with each other is a reference value or more, the steering control device 100 may determine that an error has occurred and generate a steering wheel align control signal to move the steering wheel 210 to match the actual position of the steering wheel 210 with the position of the steering wheel 210 determined based on the range information and the relative steering angle information.

Figure 3:
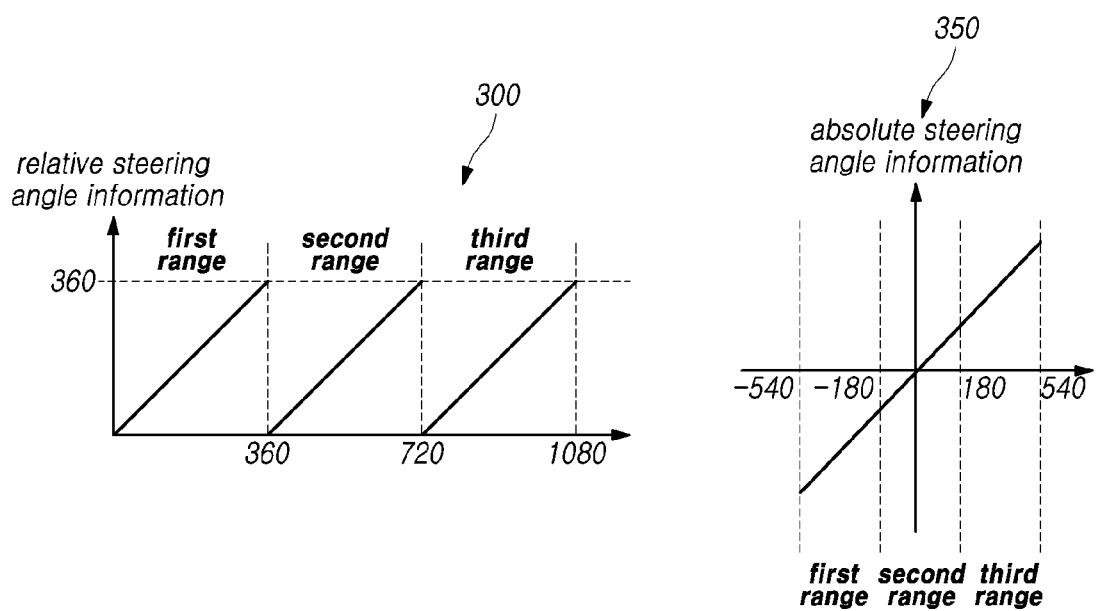
FIG. 3 is a view illustrating calculating absolute steering angle information according to an embodiment.

FIG. 3 is a view illustrating calculating absolute steering angle information according to an embodiment.

If there are two or more relative steering angle sensors, the absolute steering angle may be calculated using the phase difference between values measured by the relative steering angle sensors. However, if there is only one relative steering angle sensor, it is impossible to calculate the absolute steering angle only with the relative steering angle information based on the single relative steering angle sensor.

However, if the range information about the steering wheel may be known when ignition is turned on, even when the steering wheel is moved to a different range, the range information after the movement may be calculated by continuously measuring the relative steering angle information, and the absolute steering angle information may be calculated based on the range information and the relative steering angle information.

As an example, a first graph 300 shown in FIG. 3 represents the relative steering angle information measured according to variations in the rotational angle of the steering wheel when the steering wheel of the steering device is a product that may make three rotations in total and be rotatable within a range of 1080 degrees. The rotation range of the steering wheel may be divided into a first range from 0 degrees to 360 degrees regarding the first rotation, a second range from 0 degrees to 360 degrees regarding the second rotation, and a third range from 0 degrees to 360 degrees regarding the third rotation and, in this case, the 180 degrees of the second range indicate the neutral point in the actual position of the steering wheel.

In this case, if the range information about the steering wheel may be known when ignition is turned on, even when the steering wheel is moved to a different range, the range information after the movement may be calculated based on the range information and the relative steering angle information.

For example, in a case where the range information about the steering wheel is the second range when ignition is turned on, and the relative steering angle information is 330 degrees, if the relative steering angle increases later to 360 degrees and then becomes 0 degrees, and then increases again and becomes 30 degrees, then the steering wheel is moved from the second range to a different range, and the range information after the movement may be calculated as the third range.

A second graph 350 of FIG. 3 represents the absolute steering angle information calculated based on the range information and relative steering angle information about the same product as the steering device for the first graph 300.

In this case, the absolute steering angle information for the second graph 350 may be calculated based on the range information and relative steering angle information for the first graph 300.

For example, in a case where the range information about the steering wheel is the second range, and the relative steering angle information is 330 degrees, the relative steering angle is a point which is 150 degrees moved to the right from the neutral point of the steering wheel positioned at 180 degrees of the second range, and thus, the absolute steering angle may be calculated as +150 degrees. Alternatively, in a case where the range information about the steering wheel is the third range, and the relative steering angle information is 330 degrees, the relative steering angle is a point which is 330 degrees further moved to the right from the start point of the third range, which is 180 degrees moved to the right from the neutral point of the steering wheel, and thus, the absolute steering angle may be calculated as +510 degrees.

Figure 4:
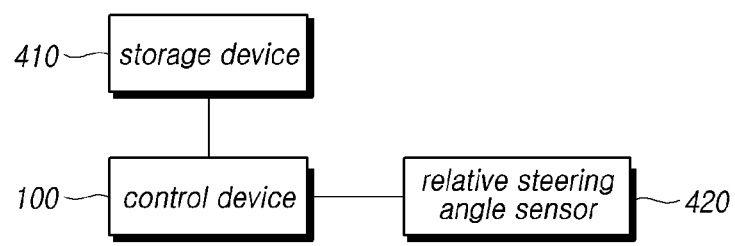
FIG. 4 is a view illustrating an example of generating a storage signal and storing range information according to an embodiment.

FIG. 4 is a view illustrating an example of generating a storage signal and storing range information according to an embodiment.

Referring to FIG. 4, upon receiving an ignition-off signal, the steering control device 100 may generate a storage signal for storing range information meeting the absolute steering angle calculation condition. Then, if the range information is stored according to the storage signal, the steering control device 100 may generate an ignition-off control signal to perform ignition-off.

The range information may be stored in the storage device 410 and, in this case, the storage device 410 may be configured as a non-volatile storage device in which the stored information does not disappear even when ignition is turned off.

In this case, when ignition is later turned on, the rotation range where the steering wheel is positioned may be figured out using the range information stored in the storage device 410. Thus, it is possible to continuously calculate the absolute steering angle information using the range information stored in the storage device 410 and the relative steering angle information sensed by the relative steering angle sensor 420 after ignition is turned on.

Figure 5:
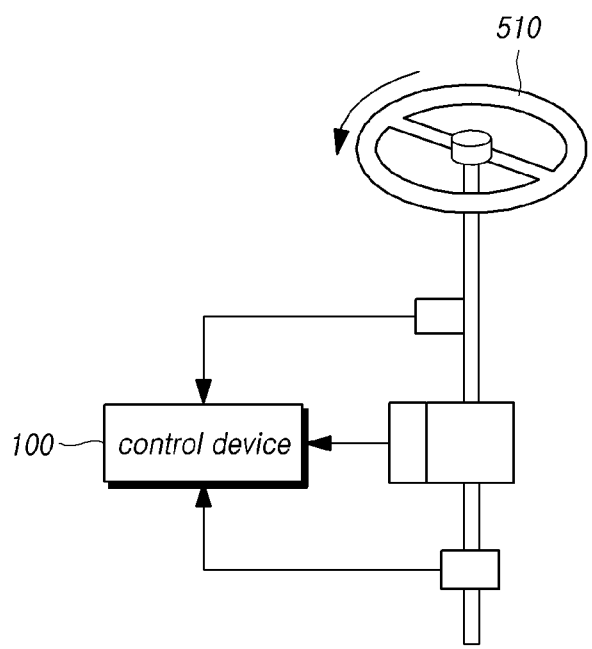
FIG. 5 is a view illustrating an example of correcting a steering wheel position upon receiving an ignition-off signal according to an embodiment.

FIG. 5 is a view illustrating an example of correcting the position of a steering wheel 510 upon receiving an ignition-off signal according to an embodiment.

Referring to FIG. 5, upon receiving an ignition-off signal, the steering control device 100 may determine whether the range information corresponds to a preset specific range to meet the absolute steering angle calculation condition and, if not corresponding to the specific range, generate a steering wheel correction control signal for moving the steering wheel 510 to the specific range. Then, if correction of the steering wheel 510 is performed according to the steering wheel correction control signal, the steering control device 100 may generate an ignition-off control signal to perform the ignition-off.

As an example, FIG. 5 illustrates a case in which the range information about the steering wheel 510 is the third range, the relative steering angle information is 30 degrees, the preset specific range is the second range including the neutral point of the steering wheel 510, and the target steering angle reference value is set to 180 degrees.

In this case, the steering control device 100 may calculate the absolute steering angle information as +210 degrees which is 30 degrees further to the right from +180 degrees which is the start point of the third range, based on the relative steering angle information being 30 degrees. Then, since the range information about the steering wheel 510 does not correspond to the second range which is the specific range, the steering control device 100 may generate a steering wheel correction control signal for moving the steering wheel to the second range.

The steering wheel correction control signal includes the content to control the steering wheel 510 to move according to the target steering angle information which is calculated as +30 degrees which is the remainder after dividing +210 degrees, which are the absolute steering angle information, by the target steering angle reference value, i.e., 180 degrees, except for the quotient.

As such, when the ignition-off signal is received, the steering control device 100 may calculate the target steering angle information and generate a steering wheel correction control signal to move the steering wheel 510 to the specific range according to the target steering angle information. Then, after correction of the steering wheel 510 is performed according to the steering wheel correction control signal, the steering control device 100 may generate a steering wheel lock control signal to prevent movement of the steering wheel, generate an ignition-off control signal, and control to perform ignition-off with the absolute steering angle calculation condition met.

Figure 6:
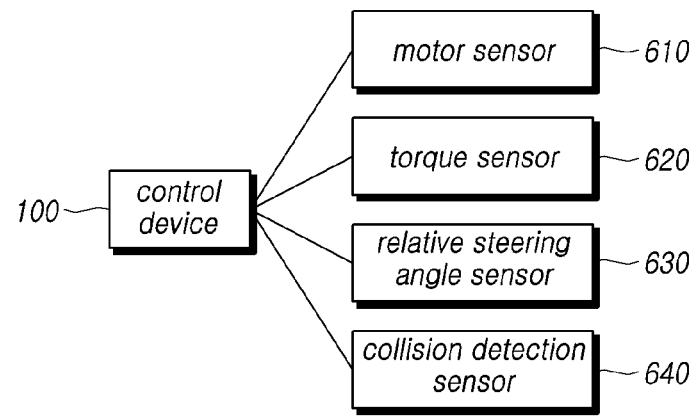
FIG. 6 is a view illustrating an example of aligning a steering wheel upon receiving an ignition-on signal according to an embodiment.

FIG. 6 is a view illustrating an example of aligning a steering wheel upon receiving an ignition-on signal according to an embodiment.

Referring to FIG. 6, upon receiving an ignition-on signal, the steering control device 100 may generate a steering wheel align control signal for aligning the steering wheel when the range sensing information and the range information differ from each other as a result of comparison or when a collision is detected after the last ignition-off based on the collision detection information.

As an example, referring to FIG. 6, upon receiving an ignition-on signal, the steering control device 100 may calculate range sensing information using other sensor information received from the motor sensor 610 or torque sensor 620 and calculate range information using the relative steering angle information received from the relative steering angle sensor 630. Then, the steering control device 100 may compare the range sensing information with the range information and, if the two pieces of information indicate different ranges, determine that an error has occurred between the position of the steering wheel calculated based on the range information and relative steering angle information and the actual position of the steering wheel. The steering wheel needs to be realigned to more precisely calculate and remove the error between the absolute steering angle information and the range information.

Further, upon receiving an ignition-on signal, the steering control device 100 may receive collision detection information from the collision detection sensor 640 for detecting vehicle collision. Based on the collision detection information received from the collision detection sensor 640, if a collision is detected after the last ignition-off, the steering wheel may be moved due to the collision, so that an error may occur between the position of the steering wheel calculated based on the range information and relative steering angle information and the actual position of the steering wheel. The steering wheel needs to be realigned to more precisely calculate and remove the error between the absolute steering angle information and the range information.

As such, when an ignition-on signal is received, the steering control device 100 may determine whether the range sensing information and the range information differ from each other or whether a collision is detected after the last ignition-off, thereby determining whether the steering wheel needs to be aligned. Then, if it is determined that the steering wheel needs to be aligned, the steering control device 100 may generate a steering wheel align control signal to match the actual position of the steering wheel with the range information and the absolute steering angle information. To align the steering wheel, any known technique for matching the actual position of the steering wheel with the measurement value, as well as techniques for aligning the steering wheel to the neutral state may be used.

The steering control device 100 is described again below in light of a method, and what has been described above is omitted as necessary, but is also applicable to the method.

Figure 7:
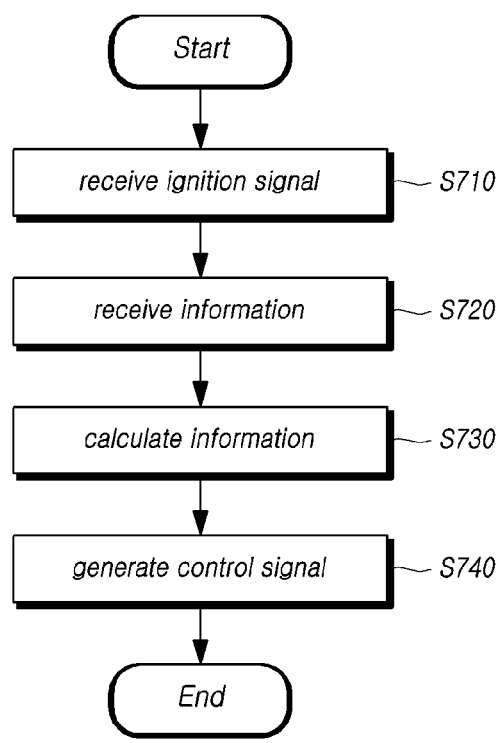
FIG. 7 is a flowchart illustrating a steering control method according to an embodiment.

FIG. 7 is a flowchart illustrating a steering control method according to an embodiment.

Referring to FIG. 7, a steering control method may comprise an ignition signal reception step S710 receiving an ignition-off signal and an ignition-on signal, an information reception step S720 receiving relative steering angle information received from a relative steering angle sensor measuring only a relative angle of a steering wheel, an information calculation step S730 calculating range information using the relative steering angle information and calculating absolute steering angle information based on the relative steering angle information and the range information, and a control signal generation step S740 determining whether an absolute steering angle calculation condition for calculating the absolute steering angle information even after ignition-off is met when the ignition-off signal is received and generating an ignition-off control signal according to a result of the determination.

The ignition signal reception step S710 may receive an ignition-off signal and ignition-on signal that are generated from an ignition switch to ignite the engine of the vehicle. However, in the disclosure, ignition-off is performed by generating an ignition-off control signal when an absolute steering angle calculation condition is met rather than performing ignition-off immediately only with generation of an ignition-off signal.

The information reception step S720 may receive relative steering angle information measured using a relative steering angle sensor. Further, the information reception step S720 may also receive other sensor information detected by other sensors, such as a motor sensor or a torque sensor, than the relative steering angle sensor, and collision detection information detected by a collision detection sensor detecting a vehicle collision.

The information calculation step S730 may calculate range information using the relative steering angle information and calculate absolute steering angle information based on the relative steering angle information and the range information. Further, the information calculation step S730 may calculate target steering angle information to move the steering wheel to a specific range when the range information does not correspond to the specific range or calculate range sensing information based on the other sensor information.

The control signal generation step S740 may determine whether an absolute steering angle calculation condition for calculating the absolute steering angle information even after ignition-off is met when the ignition-off signal is received and generate an ignition-off control signal according to a result of the determination.

Further, the control signal generation step S740 may include a storage signal generation step for storing range information when an ignition-off signal is received and generate an ignition-off control signal to perform ignition-off when the range information is stored according to the storage signal.

More various embodiments for the information calculation step S730 and the control signal generation step S740 when an ignition-off signal is received or an ignition-on signal is received are described below with reference to the drawings.

Figure 8:
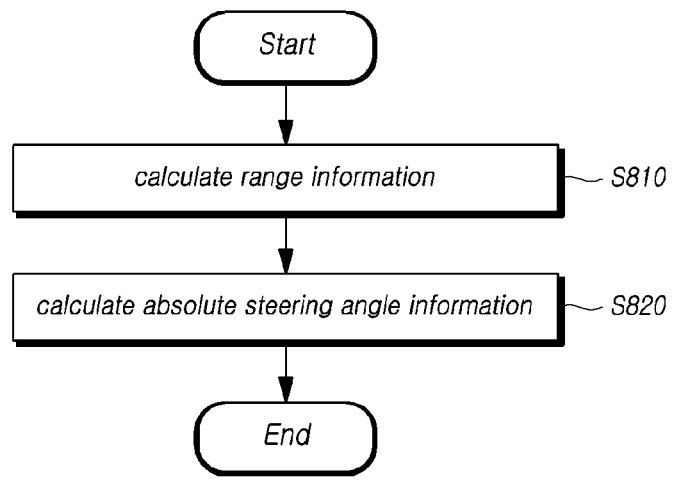
FIG. 8 is a flowchart illustrating an information calculation step according to an embodiment.

FIG. 8 is a flowchart illustrating an information calculation step S730 according to an embodiment.

Referring to FIG. 8, the information calculation step S730 may include a range information calculation step S810 and an absolute steering angle information calculation step S820.

The range information calculation step S810 may calculate the range information even with the relative steering angle information alone because it is possible to know the inter-range movement of the steering wheel through a change in the measurement value of the relative steering angle if the initial position of the steering wheel may be known.

The absolute steering angle information calculation step S820 may calculate the absolute steering angle information based on the range information and the relative steering angle information since the absolute steering angle may be calculated if the range information about the position of the steering wheel and the relative steering angle may be known.

Figure 9:
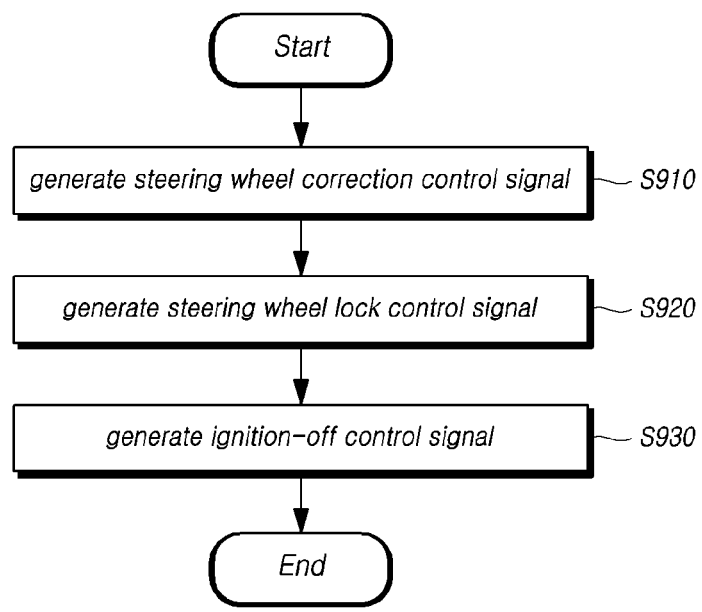
FIG. 9 is a flowchart illustrating a control signal generation step when an ignition-off signal is received according to an embodiment.

FIG. 9 is a flowchart illustrating a control signal generation step S740 when an ignition-off signal is received according to an embodiment.

Referring to FIG. 9, the control signal generation step S740 when an ignition-off signal is received may include a steering wheel correction control signal generation step S910, a steering wheel lock control signal generation step S920, and an ignition-off control signal generation step S930.

When the ignition-off signal is received, the steering wheel correction control signal generation step S910 may determine whether the range information corresponds to a preset specific range and, if not corresponding to the specific range, generate a steering wheel correction control signal for moving the steering wheel to the specific range.

If steering wheel correction is performed according to the steering wheel correction control signal, the steering wheel is positioned in the specific range and, if ignition-off is performed with the steering wheel positioned in the specific range, range information about the steering wheel may be known even when ignition is turned on later, so that the absolute steering angle calculation condition may be met.

The steering wheel correction control signal may include target steering angle information for moving the steering wheel to a specific point of the specific range, and the target steering angle information may be calculated as the remainder after dividing the absolute steering angle by a preset target steering angle reference value based on the absolute steering angle information, except for the quotient.

The steering wheel lock control signal generation step S920 may generate a steering wheel lock control signal to prevent movement of the steering wheel. Even when the absolute steering angle calculation condition is met before ignition-off, if the movement of the steering wheel is enabled after ignition-off, the rotation range of the steering wheel is changed so that the range information may be varied. Thus, it is required to prevent movement of the steering wheel after ignition-off so as to maintain the meeting of the absolute steering angle calculation condition until ignition is later turned on.

Accordingly, although the ignition-off signal is received, and the absolute steering angle calculation condition is met, a steering wheel lock control signal may be generated to prevent movement of the steering wheel and then generate an ignition-off control signal, rather than immediately generating an ignition-off control signal.

The ignition-off control signal generation step S930 may generate an ignition-off control signal to actually perform ignition-off. Since the range information about the steering wheel should be known even after ignition-off to calculate the absolute steering angle information using the relative steering angle information, it is required to determine whether the absolute steering angle calculation condition is met when the ignition-off signal is received.

Accordingly, the ignition-off control signal generation step S930 may generate an ignition-off control signal to prevent ignition from being turned off when the absolute steering angle calculation condition is not met and to allow ignition to be turned off when the absolute steering angle calculation condition is met.

In FIG. 9, the steering wheel lock control signal generation step S920 may be omitted. For example, the control signal generation step S740 when an ignition-off signal is received may only include the steering wheel correction control signal generation step S910 and the ignition-off control signal generation step S930.

Figure 10:
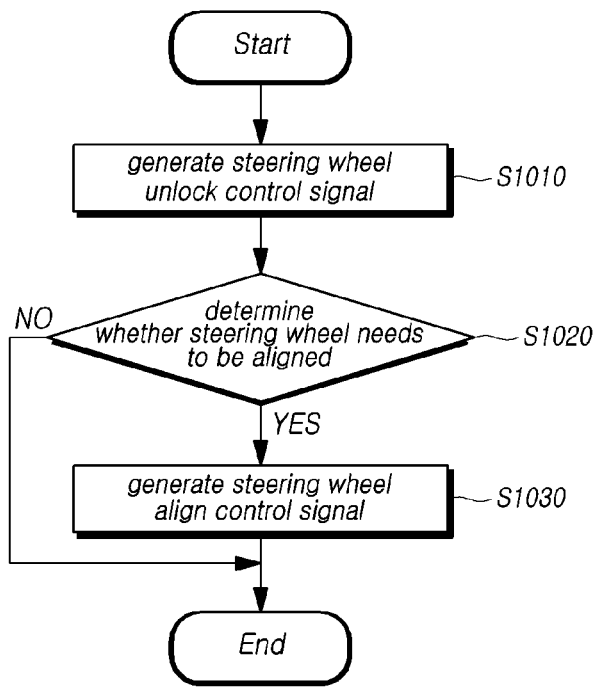
FIG. 10 is a flowchart illustrating a control signal generation step when an ignition-on signal is received according to an embodiment.

FIG. 10 is a flowchart illustrating a control signal generation step S740 when an ignition-on signal is received according to an embodiment.

Referring to FIG. 10, the control signal generation step S740 when an ignition-on signal is received may include a steering wheel unlock control signal generation step S1010, a steering wheel align determination step S1002, and a steering wheel align control signal generation step S1030.

To perform the steering of the vehicle after ignition is turned on, the steering wheel locked before the last ignition-off needs to be unlocked to enable movement of the steering wheel. Thus, the steering wheel unlock control signal generation step S1010 may generate a steering wheel unlock control signal to unlock the steering wheel to enable movement of the steering wheel if an ignition-on signal is received.

The steering wheel unlock control signal generation step S1010 may be performed only when the control signal generation step S740 when an ignition-off signal is received in FIG. 9 includes the steering wheel lock control signal generation step S920. In other words, if the steering wheel lock control signal generation step S920 before ignition-off is omitted, the steering wheel unlock control signal generation step S1010 may be omitted from the control signal generation step S740 when an ignition-on signal is received in FIG. 10.

The steering wheel align determination step S1020 compares the range information using the relative steering angle information and the range sensing information based on the other sensor information when the ignition-on signal is received and determines whether a collision is detected after the last ignition-off based on the collision detection information, thereby determining whether the steering wheel needs to be aligned.

Even when the absolute steering angle calculation condition is met so that absolute steering angle information may be calculated even with only one relative steering angle sensor, such an error as an inconsistency between the actual position of the steering wheel and the position of the steering wheel determined based on the relative steering angle and the range information may occur.

For example, as wrong range information may be calculated or the neutral of the steering wheel may be displaced due to, e.g., an error or malfunction of the relative steering angle sensor before ignition-off, an error may occur. Further, as the vehicle collides after ignition-off, the range information may be varied or the steering wheel may be moved, causing an error.

Thus, the steering wheel needs to be realigned to precisely calculate the absolute steering angle and the range information after ignition is turned on.

If it is determined that alignment of the steering wheel is not required as a result of determining whether the steering wheel needs to be aligned, the control signal generation step S740 may immediately be terminated but, if the steering wheel is determined to be required to be aligned, the steering wheel align control signal generation step S1030 is performed.

The steering wheel align control signal generation step S1030 may generate a steering wheel align control signal to match the actual position of the steering wheel with the position of the steering wheel determined based on the range information and the relative steering angle information when the steering wheel align determination step S1020 determines that the steering wheel needs to be aligned as the range sensing information and the range information differ as a result of comparison or a vehicle collision is detected after ignition-off based on the collision detection information.

To align the steering wheel, any known technique for matching the actual position of the steering wheel with the measurement value, as well as techniques for aligning the steering wheel to the neutral state may be used.

As described above, the disclosure may provide a steering control device and method capable of measuring the absolute steering angle using one relative steering angle sensor.

The disclosure may also provide a steering control device and method capable of verifying and correcting the accuracy of the absolute steering angle measurement using other sensor information and collision detection information.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering control device, comprising:
a receiver configured to receive:
an ignition-off signal and an ignition-on signal, and
relative steering angle information received from a relative steering angle sensor measuring only a relative angle of a steering wheel;
a calculator configured to calculate:
range information using the relative steering angle information, and
absolute steering angle information based on the relative steering angle information and the range information; and
a controller configured to:
when the ignition-off signal is received, determine whether an absolute steering angle calculation condition for calculating the absolute steering angle information is met even after ignition-off,
in response to determining the absolute steering angle calculation condition being not met, generate an ignition-off control signal to prevent ignition from being turned off, and
in response to determining the absolute steering angle calculation condition being met, generate the ignition-off control signal to allow ignition to be turned off.

2. The steering control device of claim 1, wherein the controller is configured to generate a storage signal for storing the range information and generate the ignition-off control signal to perform the ignition-off when the range information is stored according to the storage signal.

3. The steering control device of claim 2, wherein the calculator is configured to calculate the absolute steering angle information based on the stored range information according to the storage signal and the relative steering angle information when the ignition-on signal is received.

4. The steering control device of claim 1, wherein the controller is configured to:
determine whether the range information corresponds to a preset specific range,
in response to determining that the range information does not correspond to the specific range, generate a steering wheel correction control signal for moving the steering wheel to the specific range, and
in response to determining that steering wheel correction is performed according to the steering wheel correction control signal, generate the ignition-off control signal to perform the ignition-off.

5. The steering control device of claim 4, wherein the controller is configured to:
generate a steering wheel lock control signal for preventing movement of the steering wheel in response to the ignition-off signal being received and steering wheel correction being performed according to the steering wheel correction control signal, and
generate a steering wheel unlock control signal for releasing a locked state of the steering wheel in response to the ignition-on signal being received.

6. The steering control device of claim 4, wherein the steering wheel correction control signal includes target steering angle information for moving the steering wheel to a specific point of the specific range, and
wherein the target steering angle information is calculated as a remainder, except for a quotient, when dividing an absolute steering angle based on the absolute steering angle information by a preset target steering angle reference value.

7. The steering control device of claim 1, wherein the receiver is configured to receive other sensor information including information regarding a measurement value of a sensor other than the relative steering angle sensor, from the other sensor,
wherein the calculator is configured to calculate range sensing information regarding a range where the steering wheel is positioned using the other sensor information, and
wherein in response to the ignition-on signal being received, the controller is configured to compare the range sensing information with the range information to determine whether they are identical, and in response to a result of the comparison showing that they are different, the controller is configured to generate a steering wheel align control signal for aligning the steering wheel to a neutral state.

8. The steering control device of claim 1, wherein the receiver is configured to receive collision detection information from a collision detection sensor detecting a collision of a vehicle, and
wherein in response to the ignition-on signal being received, the controller is configured to determine whether a collision is detected after last ignition-off based on the collision detection information, and in response to the collision being detected, the controller is configured to generate a steering wheel align control signal for aligning the steering wheel to a neutral state.

9. A steering control method, comprising:
an ignition signal reception step receiving an ignition-off signal and an ignition-on signal;
an information reception step receiving relative steering angle information received from a relative steering angle sensor measuring only a relative angle of a steering wheel;
an information calculation step calculating range information using the relative steering angle information and calculating absolute steering angle information based on the relative steering angle information and the range information; and
a control signal generation step including:
when the ignition-off signal is received, determining whether an absolute steering angle calculation condition for calculating the absolute steering angle information is met even after ignition-off,
in response to determining the absolute steering angle calculation condition being not met, generating an ignition-off control signal to prevent ignition from being turned off, and in response to determining the absolute steering angle calculation condition being met, generating the ignition-off control signal to allow ignition to be turned off.

10. The steering control method of claim 9, wherein the control signal generations step includes a storage signal generation step for storing the range information, and
wherein an ignition-off control signal is generated to perform ignition-off when the range information is stored according to the storage signal.

11. The steering control method of claim 9, wherein the control signal generations step includes:
a steering wheel correction control signal generation step determining whether the range information corresponds to a preset specific range,
in response to determining that the range information does not correspond to the specific range, generating a steering wheel correction control signal for moving the steering wheel to the specific range, and
if in response to steering wheel correction being performed according to the steering wheel correction control signal, generating the ignition-off control signal to perform the ignition-off.

12. The steering control method of claim 11, wherein the control signal generations step includes:
a steering wheel lock control signal generation step generating a steering wheel lock control signal for preventing movement of the steering wheel in response to the ignition-off signal being received and steering wheel correction being performed according to the steering wheel correction control signal; and
a steering wheel unlock control signal generation step generating a steering wheel unlock control signal for releasing a locked state of the steering wheel in response to the ignition-on signal being received.

13. The steering control method of claim 11, wherein the steering wheel correction control signal includes target steering angle information for moving the steering wheel to a specific point of the specific range, and
wherein the target steering angle information is calculated as a remainder, except for a quotient, when dividing an absolute steering angle based on the absolute steering angle information by a preset target steering angle reference value.

14. The steering control method of claim 9, wherein the information reception step includes an other sensor information reception step receiving other sensor information including information regarding a measurement value of a sensor other than the relative steering angle sensor, from the other sensor,
wherein the information calculation step includes a range sensing information calculation step calculating ranging sensing information regarding a range where the steering wheel is positioned using the other sensor information, and wherein the control signal generation step includes a steering wheel align control signal generation step that in response to the ignition-on signal being received, the range sensing information is compared with the range information to determine whether they are identical and, in response to a result of the comparison showing that they are different, a steering wheel align control signal is generated for aligning the steering wheel to a neutral state.

15. The steering control method of claim 9, wherein the information reception step includes a collision detection information reception step receiving collision detection information from a collision detection sensor detecting a collision of a vehicle, and
wherein the control signal generation step includes a steering wheel align control signal generation step that in response to the ignition-on signal being received, whether a collision is detected after last ignition-off is determined based on the collision detection information, and in response to the collision is detected, a steering wheel align control signal is generated for aligning the steering wheel to a neutral state.

16. A steering control device, comprising:
a receiver receiving an ignition-off signal and an ignition-on signal and receiving relative steering angle information received from a relative steering angle sensor measuring only a relative angle of a steering wheel;
a calculator calculating range information using the relative steering angle information and calculating absolute steering angle information based on the relative steering angle information and the range information; and
a controller determining whether an absolute steering angle calculation condition for calculating the absolute steering angle information even after ignition-off is met when the ignition-off signal is received, and generating an ignition-off control signal according to a result of the determination,
wherein
the controller determines whether the range information corresponds to a preset specific range and, if the range information does not correspond to the specific range, generates a steering wheel correction control signal for moving the steering wheel to the specific range,
if steering wheel correction is performed according to the steering wheel correction control signal, generates the ignition-off control signal to perform the ignition-off, and
the controller generates a steering wheel lock control signal for preventing movement of the steering wheel if the ignition-off signal is received, and steering wheel correction is performed according to the steering wheel correction control signal, and generates a steering wheel unlock control signal for releasing a locked state of the steering wheel if the ignition-on signal is received.

* * * * *